(12) United States Patent
Lin et al.

(10) Patent No.: US 7,089,925 B1
(45) Date of Patent: Aug. 15, 2006

(54) RECIPROCATING WIRE SAW FOR CUTTING HARD MATERIALS

(75) Inventors: Frank S. Lin, Taipei (TW); Chien-Min Sung, Taipei (TW)

(73) Assignee: Kinik Company, Tansui (TW)

( * ) Notice: Subject to any disclaimer, the term of this patent is extended or adjusted under 35 U.S.C. 154(b) by 0 days.

(21) Appl. No.: 10/922,231

(22) Filed: Aug. 18, 2004

(51) Int. Cl.
B28D 1/08 (2006.01)

(52) U.S. Cl. ............... 125/21; 125/12; 125/16.01; 125/19; 125/20; 451/296; 451/311

(58) Field of Classification Search .......... 125/12, 125/16.01, 19, 20, 21; 451/296, 311
See application file for complete search history.

(56) References Cited

U.S. PATENT DOCUMENTS

| 187,593 | A | 2/1877 | Brown et al. |
| 1,988,065 | A | 1/1935 | Wooddell |
| 2,078,354 | A | 4/1937 | Webster |
| 2,268,663 | A | 1/1942 | Kuzmick |
| 2,612,348 | A | 9/1952 | Catallo |
| 2,725,693 | A | 12/1955 | Smith |
| 2,811,960 | A | 11/1957 | Fessel |
| 2,867,086 | A | 1/1959 | Haley |
| 2,876,086 | A | 3/1959 | Raymond |
| 2,952,951 | A | 9/1960 | Simpson |
| 3,067,551 | A | 12/1962 | Maginnis |
| 3,121,981 | A | 2/1964 | Hurst |
| 3,127,715 | A | 4/1964 | Chrstensen |
| 3,146,560 | A | 9/1964 | Hurst |
| 3,276,852 | A | 10/1966 | Lemelson |
| 3,293,012 | A | 12/1966 | Smiley et al. |
| 3,372,010 | A | 3/1968 | Parsons |
| 3,630,699 | A | 12/1971 | Caitlin |
| 3,802,130 | A | 4/1974 | Lindenbeck |
| 3,894,673 | A | 7/1975 | Lowder et al. |
| 3,942,508 | A | 3/1976 | Shimizu |
| 3,982,358 | A | 9/1976 | Fukuda |
| 4,015,931 | A | 4/1977 | Thakur |
| 4,018,576 | A | 4/1977 | Lowder et al. |
| 4,067,312 | A | 1/1978 | Tessner |
| 4,134,384 | A | 1/1979 | Schafft et al. |

(Continued)

FOREIGN PATENT DOCUMENTS

EP    0238434    3/1987

(Continued)

OTHER PUBLICATIONS

Material Safety Data Sheet (MSDS), Wall Colmonoy Corporation, prepared Jul. 20, 1989.

(Continued)

Primary Examiner—Joseph J. Hall, III
Assistant Examiner—Shantese L. McDonald
(74) Attorney, Agent, or Firm—Thorpe North & Western, LLP

(57) ABSTRACT

The present invention features a reciprocating wire saw particularly adapted or configured for cutting hard materials. In one aspect, the reciprocating wire saw comprises (a) a flexible wire; (b) a plurality of cutting segments fittable onto the flexible wire, wherein each of the cutting segments comprises an outer surface; and a (c) plurality of superabrasive particles braze bonded onto the outer surface of the cutting segments to form a cutting wire. In another aspect, the reciprocating wire saw comprises a plurality of superabrasive particles braze bonded directly to the wire itself to form a cutting wire. The cutting wire is unique in that it comprises a pre-determined superabrasive particle concentration and is configured to cut various materials, such as granite, in a reciprocating manner.

29 Claims, 5 Drawing Sheets

U.S. PATENT DOCUMENTS

| | | |
|---|---|---|
| 4,211,294 A | 7/1980 | Multakh |
| 4,341,532 A | 7/1982 | Oide |
| 4,355,489 A | 10/1982 | Heyer et al. |
| 4,484,502 A | 11/1984 | Ebner |
| 4,565,034 A | 1/1986 | Sekiya |
| 4,566,428 A | 1/1986 | Roujon |
| 4,669,522 A | 6/1987 | Griffin |
| 4,674,474 A | 6/1987 | Baril |
| 4,680,199 A | 7/1987 | Vontell et al. |
| 4,712,552 A | 12/1987 | Pangburn |
| 4,780,274 A | 10/1988 | Barr |
| 4,856,490 A | 8/1989 | Kawase et al. |
| 4,866,888 A | 9/1989 | Murai |
| 4,883,500 A | 11/1989 | Deakins et al. |
| 4,908,046 A | 3/1990 | Wiand |
| 4,916,869 A | 4/1990 | Oliver |
| 4,925,457 A | 5/1990 | DeKok et al. |
| 4,943,488 A | 7/1990 | Sung |
| 4,949,511 A | 8/1990 | Endo et al. |
| 4,968,326 A | 11/1990 | Wiand |
| 5,000,273 A | 3/1991 | Horton et al. |
| 5,022,895 A | 6/1991 | Wiand |
| 5,030,276 A | 7/1991 | Sung et al. |
| 5,049,165 A | 9/1991 | Tselesin |
| 5,052,366 A | 10/1991 | Matsukura |
| 5,077,902 A | 1/1992 | Hitt |
| 5,080,086 A | 1/1992 | Tomlinson et al. |
| 5,092,082 A | 3/1992 | Padberg et al. |
| 5,092,910 A | 3/1992 | deKok et al. |
| 5,131,924 A | 7/1992 | Wiand |
| 5,133,782 A | 7/1992 | Wiand |
| 5,164,247 A | 11/1992 | Solanki et al. |
| 5,176,155 A | 1/1993 | Rudolph |
| 5,190,568 A | 3/1993 | Tselesin |
| 5,203,881 A | 4/1993 | Wiand |
| 5,246,884 A | 9/1993 | Jaso |
| 5,266,236 A | 11/1993 | Bovenkerk |
| 5,380,390 A | 1/1995 | Tselesin |
| 5,453,106 A | 9/1995 | Roberts |
| 5,518,443 A | 5/1996 | Fisher |
| 5,527,424 A | 6/1996 | Mullins |
| 5,620,489 A | 4/1997 | Tselesin |
| 5,746,931 A | 5/1998 | Graebner |
| RE35,812 E | 6/1998 | Oliver |
| 5,778,869 A | 7/1998 | Toyama |
| 5,810,643 A | 9/1998 | Toyama |
| 5,816,891 A | 10/1998 | Woo |
| 5,820,450 A | 10/1998 | Calhoun |
| 5,833,519 A | 11/1998 | Moore |
| 5,855,314 A | 1/1999 | Shiue |
| 5,885,137 A | 3/1999 | Ploessl |
| 5,902,173 A | 5/1999 | Tanaka |
| 5,916,011 A | 6/1999 | Kim |
| 5,921,856 A | 7/1999 | Zimmer |
| 5,947,798 A | 9/1999 | Toyama |
| 5,961,373 A | 10/1999 | Lai |
| 5,976,205 A | 11/1999 | Andrews et al. |
| 6,001,008 A | 12/1999 | Fujimori et al. |
| 6,039,641 A | 3/2000 | Sung |
| 6,067,976 A | 5/2000 | Katayama et al. |
| 6,102,024 A * | 8/2000 | Buljan et al. ............... 125/21 |
| 6,106,382 A | 8/2000 | Sakaguchi |
| 6,109,253 A | 8/2000 | Ikehara |
| 6,113,473 A | 9/2000 | Costantini et al. |
| 6,123,612 A | 9/2000 | Goers |
| 6,145,499 A | 11/2000 | Tsuchishima |
| 6,178,961 B1 | 1/2001 | Nagatsuka et al. |
| 6,190,240 B1 | 2/2001 | Kinoshita et al. |
| 6,193,770 B1 | 2/2001 | Sung |
| 6,194,068 B1 | 2/2001 | Ohashi et al. |
| 6,213,856 B1 | 4/2001 | Cho et al. |
| 6,234,160 B1 | 5/2001 | Nagatsuka et al. |
| 6,286,498 B1* | 9/2001 | Sung ........................ 125/12 |
| 6,325,709 B1 | 12/2001 | Nanda et al. |
| 6,352,071 B1 | 3/2002 | Kononchuk et al. |
| 6,368,198 B1 | 4/2002 | Sung et al. |
| 6,390,896 B1 * | 5/2002 | Huber et al. ............... 451/59 |
| 6,409,580 B1 | 6/2002 | Lougher |
| 6,543,434 B1 * | 4/2003 | Holzmuller et al. .......... 125/21 |
| 6,551,176 B1 | 4/2003 | Garretson |
| 6,679,243 B1 | 1/2004 | Sung |
| 6,881,131 B1 * | 4/2005 | Parsells et al. ............... 451/53 |
| 2001/0002561 A1 | 6/2001 | Shiraga et al. |
| 2003/0145707 A1 | 8/2003 | Hauser |

FOREIGN PATENT DOCUMENTS

| | | |
|---|---|---|
| EP | 0331344 | 2/1989 |
| EP | 0264674 | 9/1995 |
| JP | 10180618 | 7/1998 |
| JP | 11048122 | 2/1999 |
| JP | 11077536 | 3/1999 |
| JP | 10128654 | 5/1999 |
| WO | 95/27596 | 11/1995 |
| WO | 98/10897 | 3/1998 |
| WO | 98/45091 | 3/1998 |
| WO | 98/45092 | 3/1998 |
| WO | 98/51448 | 3/1998 |

OTHER PUBLICATIONS

Kennametal Specification for DMHPM002 Hot Press Matrix N-50 (Dec. 6, 2001).

Material Safety Data Sheet (MSDS), Kennametal, issued Jun. 11, 2004.

Endecott's Specifications (2004).

Colmonoy Technical Data Sheet, No. DSP-1A (1993).

* cited by examiner

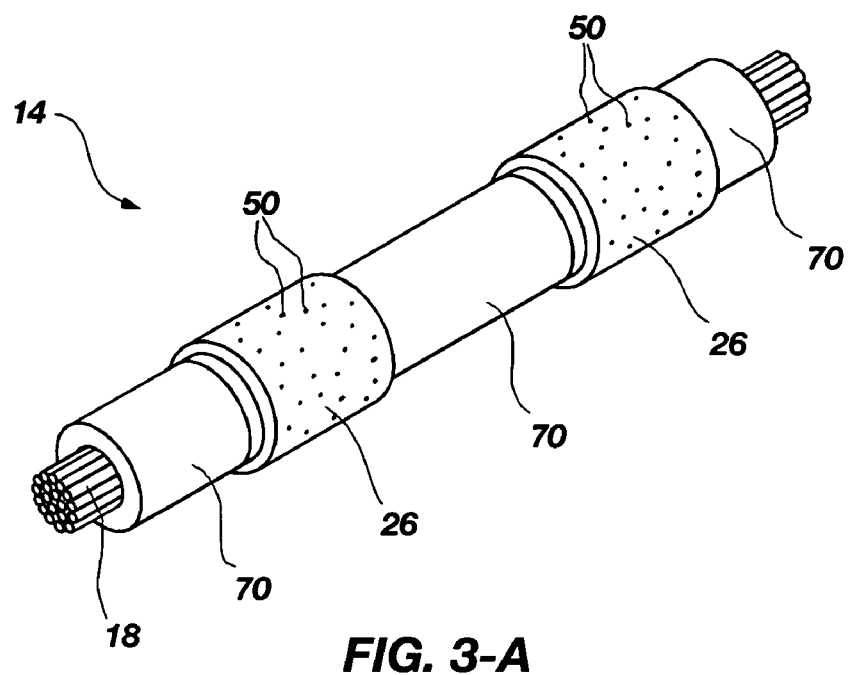
FIG. 3-A
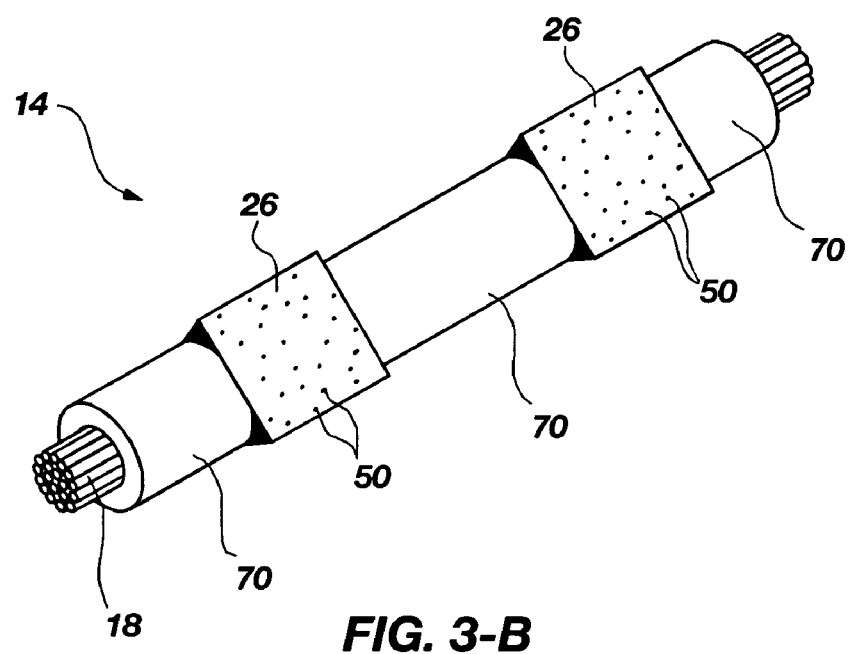
FIG. 3-B

RECIPROCATING WIRE SAW FOR CUTTING HARD MATERIALS

FIELD OF THE INVENTION

The present invention relates generally to wire cutting saws having superabrasive particles, such as diamonds or diamond particles, formed on a wire, wherein the superabrasive particles are chemically bonded to a matrix support material used to hold the particles in place. More specifically, the present invention relates to a reciprocating wire cutting saw having superabrasive particles concentrated about a cable or tubing, or a cutting segment locatable on the cable, wherein the wire saw provides a bi-directional, reciprocating cutting action suitable for use in cutting hard materials. The present invention further relates to various methods for cutting hard materials using a reciprocating wire saw.

BACKGROUND OF THE INVENTION AND RELATED ART

Several different abrasive-type cutting saws exist in the marketplace, each of which employ one or more abrasive or superabrasive materials, such as diamond, formed on a cutting segment that actually performs the cutting function. These conventional abrasive-type cutting saws include circular saws, frame saws, wire saws, chain saws, band saws, and others. The typical design of these conventional saws is to provide a unidirectional cutting motion, meaning that the cutting segments move only in one direction during the cutting process. This is particularly true when cutting hard materials, such as granite stone or quartzite.

It is well established that unidirectional cutting provides, as one advantage, high speed cutting. Moreover, unidirectional cutting allows the abrasive particles, namely the diamond grit, to be supported by the "bond-tail" of the matrix material left behind during the cutting action. Due to the lack of mechanical support, the abrasive particles or diamond grit will be knocked off easily by the impact force encountered. This is particularly true for those cutting members attached by mechanical means, such as by electroplating with nickel or by sintering with a metal matrix.

In the case of an impregnated diamond bead, placement of the diamond particles on the bead is difficult to maintain due to the physical characteristics of the diamond particles and the way they are mounted onto the bead. This is particularly true if cutting hard rock, such as granite. As such, it is crucial that a remnant of the metal matrix be left behind to reinforce each diamond particle and to maintain its proper placement on the bead during cutting.

With respect to the cutting of hard materials or substances, although unidirectional cutting has the advantage of enabling high cutting speeds and adequate abrasive particle support, there are several inherent deficiencies and limitations to unidirectional cutting. Moreover, unidirectional cutting is currently the only way to cut harder materials. In the case of circular saws and chain saws, the cutting depths are limited by the relative distance between the support or holding elements. In addition, these have a difficult time maintaining a continuously straight cutting path due to the often weak mechanical support from the holding elements. In the case of the band saw, the cutting span is very small. Furthermore, the abrasive particles are typically fixed to the cutting segment by electrodeposition, which is not strong enough to withstand the cutting of hard materials.

Only some of the above-identified abrasive-type saws allow parallel sawing of multiple blades. Chain saws and band saws typically cut with only a single blade, but circular saws and wire saws may comprise a plurality of blades. Of particular note, frame saws are capable of cutting with more than one hundred blades. Consequently, this is the most attractive saw for cutting and slicing large slabs or blocks of material. However, because frame saws move in a bidirectional or reciprocating manner, the "bond-tail" is lost. As a result, frame saws can only cut soft material, such as limestone because of the relatively weak support of the abrasive elements. If a frame saw, with its reciprocating motion, is used on hard material, such as granite, the abrasive cutting segments will fail. In other words, the abrasive particles will be ripped from the cutting segment as their support structure is not able to withstand the acting forces created during the cutting session as the cutting segment is applied to the hard material. Therefore, cutting hard materials remains a difficult task.

The most inexpensive way to cut hard materials is by sawing them with a steel blade frame saw that effectively achieves a grinding effect. During the cutting session, the steel blades are slid back and forth against the material while a slurry of iron grit and lime mud is fed into the cutting groove. The hard material is gradually eroded away by chemical reaction and mechanical abrasion. However, this is an extremely slow process and is also environmentally unfriendly. During operation, the steel blades grind away at the granite until it is cut. To illustrate how slow this process is, it takes four days to slice through 5 m$^2$ of a granite block with a blade of this type. Other problems exist. First, it is difficult to keep the cutting path straight. Second, iron particles may produce stains on the material if the saw is exposed to humid weather for an extended period of time. Each of these lead to a significant amount of post-cut preparation and finishing. Third, because the steel blade is not cutting, but grinding, there is a substantial amount of vibration that can cause the often brittle material to crack. Fourth, the number of slabs that can be produced is limited, thus tipping the supply and demand scale against the consumer. Fifth, the slabs produced are relatively thick, thus limiting their use. For example, it is more desirable to use thin slabs when covering the exterior of a building as thicker slabs are heavy and expensive. Moreover, if the slabs could be cut large and thin, they could be used to replace wood and plastics as decorative coverings or linings. This is not currently possible. Although slow, and although there are several inherent deficiencies, this cutting system and method represents the most viable and economical way of cutting large blocks of hard materials that is available today.

Alternatively, in recent years abrasive-type wire saws have been utilized to slice through and cut granite blocks. Among the several different types of abrasive-type cutting saws, wire saws are a relatively new and unique addition to the family of abrasive-type cutting saws having originated from within the stone quarry industry, wherein the wire saws were created for the purpose of cutting and/or demolishing both stone and concrete in a more precise manner. Since their inception, wire saws have been modified and redesigned to provide specialized cutting in a wide variety of industries. As such, several variations of wire saws exist for use within a number of corresponding applications. As mentioned, one of the more common applications is in the stone cutting industry, wherein wire saws are utilized to cut concrete, stone, and other similar materials. Another common application is in the semiconductor industry, wherein wire saws are utilized to cut a silicon ingot to prepare a large diameter, thin-body silicon wafer used for manufacturing semiconductor devices.

The driving force behind the success of wire saws is the cutting wire itself and the technology used to create the cutting wire. Essentially, a cutting wire comprises a flexible steel carrier cable that is threaded through a series of steel segments or beads to which one or more abrasive materials is bonded or attached. The abrasive segments or beads are often called diamond beads or diamond peals. This is because the abrasive material most commonly used is diamond as it is the hardest and most durable abrasive material available. Indeed, diamond is widely used as a superabrasive on saws, drills, and other devices which utilize the abrasive to cut, shape and/or polish other hard materials. Diamond coated tools are particularly suited for applications where other cutting tools lack sufficient hardness and durability. For example, in the stone industry, diamond cutting tools are about the only type which are sufficiently hard and durable to make the cutting economical. Likewise, in the precision grinding industry, diamond tools, due to their superior wear resistance, are uniquely capable of developing the tight tolerances required, while simultaneously withstanding wear.

Typically, these diamond beads are made of steel cylinders having diamond particles or grits embedded on their exterior. There are several different sizes of diamond beads depending upon the intended application and the object to be cut. The most common sizes range anywhere from 6 mm in diameter to 10 mm in diameter. However, a smaller diameter diamond bead will narrow the kerf and the resulting loss of material than a larger diameter diamond bead.

The diamond beads are mounted in succession onto or about a flexible steel cable so as to be positioned at a fixed distance (e.g., approximately 40 diamond beads per meter) with respect to one another. The positioning of the diamond beads along the cable is pre-determined by the existence of steel, plastic, or rubber spacers lodged between each diamond bead. These spacers also serve as a protective coating for the steel cable, thus preventing its exposure to corrosive elements and prolonging its life.

Currently, there are three basic types of cutting wires. The first comprises a series of electroplated diamond segments or beads with compressed steel spring spacers therebetween. The second comprises a series of impregnated diamond beads, also with compressed steel spring spacers positioned therebetween. The third comprises a series of impregnated diamond beads with injection-molded plastic spacers positioned therebetween. From this, it is apparent that there are also two current primary bonding methods employed for manufacturing the various diamond beads. The method for creating an electroplated cutting wire involves attaching a single layer of diamond to the steel bead using electroplated nickel. The method for creating an impregnated bonding cutting wire involves pressing and sintering a diamond impregnated metal matrix to or around the steel bead, wherein the matrix comprises a blended powder metal alloy and diamond mixture, thus providing multiple diamond layers for more efficient and prolonged cutting. However, both of these types of conventional diamond beads are limited in their cutting ability when applied to hard materials, such as granite stone, as the diamond particles are mechanically coupled and subject to premature failure. Specifically, both the electroplated diamond beads and the impregnated diamond beads, produced as described, are only suited for unidirectional cutting of hard materials, and not for cutting such materials in a reciprocating manner. As discussed above with respect to frame saws, the cutting of hard materials in a reciprocating manner would effectively cause the diamond beads to fail.

Although many different types of wire saws exist, one conventional design that is frequently used to cut concrete, stone, and other hard materials comprises a loop of wire mounted on a series of pulleys, wherein the wire is further coupled to a flywheel that is driven by a hydraulic or electric motor. The wire, having a plurality of diamond beads, moves in a unidirectional, circular motion along its identified course at high speeds to perform the actual cutting function. While these wire saws present an alternative cutting system to the frame saws discussed above, there are still several significant disadvantages, thus they are seldom used. For example, wire saws are extremely expensive to manufacture compared to the lifespan of the cutting wire. In addition, the kerf from current wire saws is much larger than that produced by the frame saws, thus reducing the overall yield. Still further, although advantageous, current abrasive-type wire saws are unable to be operated in a reciprocating manner to produce a bi-directional cutting motion due to the limitations in the mounting of the abrasives. Although abrasives such as diamond have proven to be superior cutting particles, and although abrasive tools have long been used in numerous applications, including cutting, drilling, sawing, grinding, lapping and polishing materials, these have not been successfully utilized in wire saw in a reciprocating manner for the specific purpose of cutting hard materials.

SUMMARY OF THE INVENTION

In light of the problems and deficiencies inherent in the prior art, the present invention seeks to overcome these by providing an abrasive-type reciprocating wire saw capable of operating in a manner to produce a bidirectional cutting motion, wherein the reciprocating wire saw is particularly suited for the specific purpose of cutting and slicing hard objects or materials, such as granite stone, quartzite, concrete, and others.

Therefore, it is an object of some of the exemplary embodiments of the present invention to provide a reciprocating wire saw having improved superabrasive particle retention properties and improved cutting capabilities.

It is another object of some of the exemplary embodiments of the present invention to provide an abrasive-type wire saw configured to cut hard objects or materials.

It is another object of some of the exemplary embodiments of the present invention to provide an abrasive-type wire saw configured to execute a reciprocating, bi-directional cutting motion.

It is still another object of some of the exemplary embodiments of the present invention to provide an abrasive-type wire saw comprising a plurality of cutting wires configured to achieve parallel cutting or sawing of hard objects or materials.

It is a further object of some of the exemplary embodiments of the present invention to cut hard objects and materials with high productivity and environmental safety.

It is still a further object of some of the exemplary embodiments of the present invention to provide an abrasive-type reciprocating wire saw having disposable cutting wire that are inexpensive to manufacture.

It is still a further object of some of the exemplary embodiments of the present invention to cut or slice hard objects or materials into large or small slabs that are thin in thickness compared to slabs produced by prior related systems and methods.

It is still a further object of some of the exemplary embodiments of the present invention to provide a wire saw comprising abrasive-type cutting segments that are capable of cutting hard objects and materials in a reciprocating manner.

It is still a further object of some of the exemplary embodiments of the present invention to provide a reciprocating wire saw having an abrasive-type cutting segment that produces a small or narrow kerf compared to prior related abrasive-type cutting segments.

Although several objects of some of the various exemplary embodiments have been specifically recited herein, these should not be construed as limiting the scope of the present invention in any way. Indeed, it is contemplated that each of the various exemplary embodiments comprises other objects that are not specifically recited herein. These other objects will be apparent to and appreciated by one of ordinary skill in the art upon practicing the invention as taught and described herein.

To achieve the foregoing objects, and in accordance with the invention as embodied and broadly described herein, the present invention features a reciprocating wire saw particularly adapted or configured for cutting hard materials. In one exemplary embodiment, the reciprocating wire saw comprises (a) a flexible wire; (b) a plurality of beads, each comprising an outer surface; and (c) a plurality of superabrasive particles braze bonded onto the outer surface. The beads comprise a similar inside diameter as the diameter of the wire and are threaded onto the flexible wire to form a cutting wire. The cutting wire is unique in that it comprises a pre-determined superabrasive particle concentration braze bonded to the beads, such that the cutting wire is configured to cut hard materials in a reciprocating manner.

In another exemplary embodiment, the reciprocating wire comprises (a) a flexible wire; and (b) a concentration of superabrasive particles braze bonded directly onto at least a portion of the flexible wire to form a cutting wire having a pre-determined superabrasive particle concentration and configured to cut hard materials in a reciprocating manner. In this embodiment as the superabrasive particles are bonded directly to the wire, thus not requiring beads, cutting wires may be made relatively thin, such as around 0.3 mm.

Depending upon the particular type of cutting wire, superabrasive particle concentration will change. However, in most embodiments, the cutting wire will comprises an increased superabrasive particle concentration over prior related unidirectional cutting wires. This is a direct result of the brazing or braze bonding technique used to secure the superabrasive particles to the wire. In addition to the increased superabrasive particle concentration over unidirectional wire saws, the present invention cutting wires will also be much smaller.

The present invention further features various methods for using a reciprocating wire saw to cut hard materials.

By using smaller disposable brazed particle beads to make disposable cutting wires with a given reciprocating stroke, say one meter, higher value can be created while at the same time reducing the costs of manufacturing.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIG. 3-A illustrates a partial isometric view of an exemplary wire saw comprising beads having a circular cross-sectional area as threaded onto a flexible wire separated by spacers;

FIG. 3-B illustrates a partial isometric view of an exemplary wire saw comprising beads having a rectangular or square cross-sectional area as threaded onto a flexible wire separated by spacers;

DETAILED DESCRIPTION OF EXEMPLARY EMBODIMENTS

Figure 1:
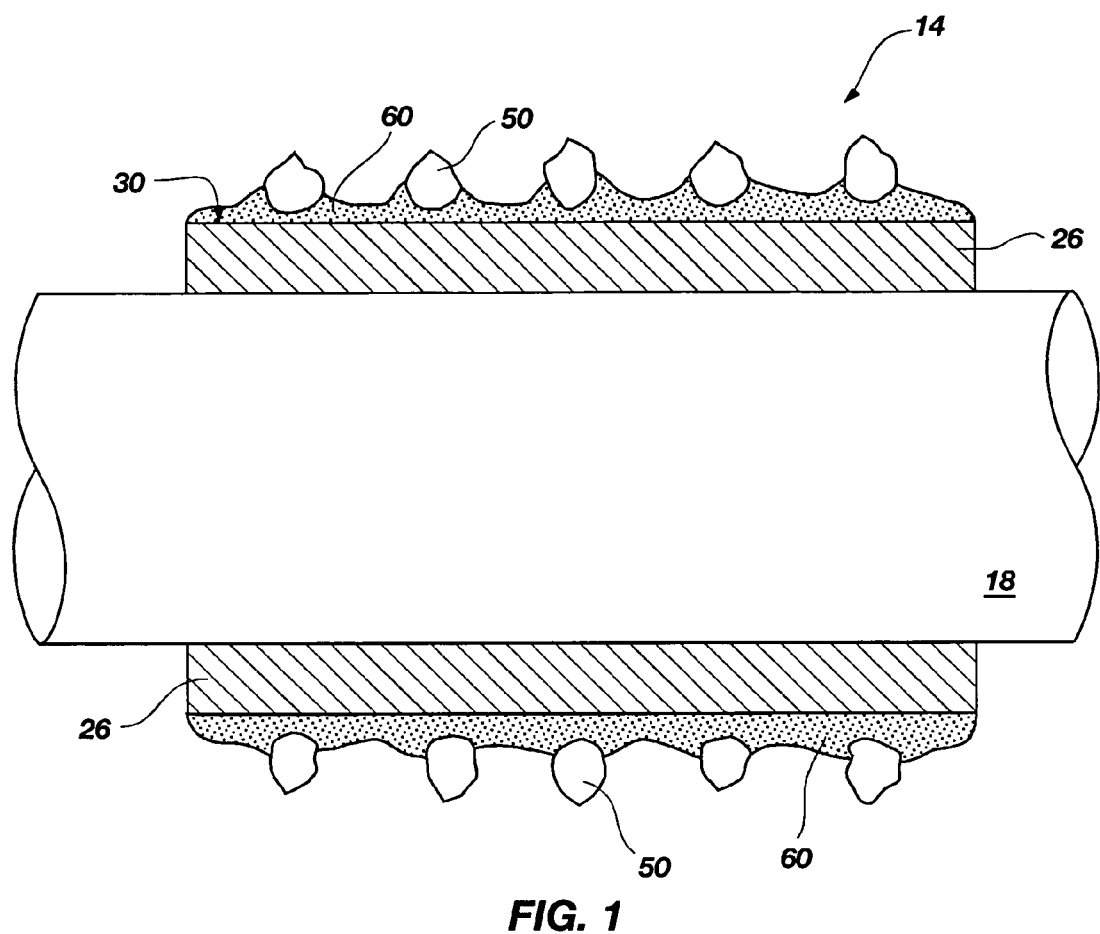
FIG. 1 illustrates a cut-away cross-section view of an exemplary wire saw comprising a bead threaded thereon, wherein the bead comprises superabrasive particles braze bonded to its outer surface.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art practice the invention, it should be understood that other embodiments may be realized and that various changes to the invention may be made without departing from the spirit and scope of the present invention. Thus, the following more detailed description of the embodiments of the present invention, as represented in FIGS. 1 through 6, is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

In general terms, the present invention features a reciprocating wire saw configured or suited to cut through hard materials, such as granite or quartzite, wherein the cutting wire of the wire saw is equipped with a plurality of cutting particles, namely superabrasive particles or grits, such as diamond, bonded either to the wire itself or to a cutting segment, commonly referred to as a bead, that is threaded onto the wire in succession with other similar cutting segments. The superabrasive particles and the wire to which they are bonded combine and function to form a cutting tool or a cutting wire. Unlike many prior related wire saws, the superabrasive particles are not mechanically supported about the wire or the cutting segment, but are instead chemically bonded to the wire or cutting segment using a molten brazing process. This brazing process anchors the superabrasive particles, or rather significantly increases the retention characteristics of the superabrasive particles, such that the wire saw may be used to cut hard materials in a reciprocating or oscillating manner. Unlike conventional wire saws, the wire saw of the present invention is capable of withstanding the various forces acting upon the superabrasive particles acting upon the wire during the cutting process, such as impact forces, compression forces, shear forces, and others.

In practice, the present invention enables hard materials to be cut by a reciprocating or oscillating wire saw utilizing one or more cutting wires having superabrasive particles situated about its exterior, or about the exterior of several cutting segments (e.g., beads) that are threaded or otherwise fit onto or supported by the wire. Thus, it is noted herein that some exemplary embodiments comprise a cutting wire, wherein the superabrasive particles are bonded to a cutting segment, otherwise known as a bead, which is then threaded onto the wire in combination with other similarly made beads. Other exemplary embodiments comprise a cutting wire, wherein the superabrasive particles are bonded directly to the wire or cable rather than to a cutting segment or bead.

As these abrasive particles or superabrasive particles are chemically bonded with a molten braze to the beads, thus providing a secure anchor, reciprocating (or bi-directional or oscillating) cutting is made possible. In addition, by brazing the superabrasive particles around the exterior of the beads, the size or diameter of the present invention beads can be made much smaller than conventional beads. This means that the wire onto which the beads are threaded may also be made smaller so as to provide a much thinner cutting wire that produces a much thinner or narrower cut, resulting in less kerf loss. Indeed, the beads of the present invention, and the wires onto which they are threaded to form a cutting wire, may be manufactured up to ten times smaller than prior related or conventional beads and/or wires, thus providing many advantages and benefits over prior related wire saws.

Preliminarily, in describing and claiming the present invention, the following terminology will be used in accordance with the definitions set forth below.

The phrases "super hard" and "superabrasive," and similar phraseology, as used herein, is understood to refer to a crystalline, or polycrystalline material, or mixture of such materials having a Vicker's hardness of about 4000 kg/mm$^2$ or greater. Such materials may include without limitation, diamond, and cubic boron nitride (cBN), as well as other materials known to those skilled in the art. While superabrasive materials are very inert and thus difficult to form chemical bonds with, it is known that certain reactive elements, such as chromium and titanium are capable of chemically reacting with superabrasive materials at certain temperatures.

The term "metallic," and similar terminology, as used herein, shall be understood to refer to a metal, or an alloy of two or more metals. A wide variety of metallic materials are known to those skilled in the art, such as aluminum, copper, chromium, iron, steel, stainless steel, titanium, tungsten, zinc, zirconium, molybdenum, etc., including alloys and compounds thereof.

The phrases "particle" and "grit," as used herein, may be used interchangeably, and shall be understood to refer to a superabrasive material or to a particulate form of such material. Such particles or grits may take a variety of shapes, including round, oblong, square, euhedral, etc., as well as a number of specific mesh sizes. As is known in the art, "mesh" refers to the number of holes per unit area as in the case of U.S. meshes.

The phrases "reactive element" and "reactive metal," as used herein, may be used interchangeably and shall be understood to refer to a metal element that can chemically react with and chemically bond to a superabrasive particle. Examples of reactive elements may include without limitation, transition metals such as titanium (Ti) and chromium (Cr), including refractory elements, such as zirconium (Zr) and tungsten (W), as well as non-transition metals and other materials, such as aluminum (Al). Further, certain elements such as silicon (Si) which are technically non-metals may be included as a reactive element in a brazing alloy.

The phrases "chemical bond" and "chemical bonding," as used herein, may be used interchangeably and shall be understood to a molecular bond that exerts an attractive force between atoms that is sufficiently strong to create a binary solid compound at an interface between the atoms. Chemical bonds involved in the present invention are typically carbides in the case of diamond superabrasive particles, or nitrides or borides in the case of cubic boron nitride.

The phrases "braze alloy" and "brazing alloy," as used herein, may be used interchangeably and shall be understood to refer to an alloy containing a sufficient amount of a reactive element to allow the formation of chemical bonds between the alloy and a superabrasive particle. The alloy may be either a solid or liquid solution of a metal carrier solvent having a reactive element solute therein.

The term "brazed" or "brazing" may be used to refer to the formation of a chemical bond between superabrasive particles and a braze alloy.

The terms "coat," "coating," and "coated," as used herein, and with respect to a reactive metal alloy, or a braze alloy, shall be understood to refer to a layer of such an alloy that is chemically bonded to a superabrasive particle along at least a portion of an outer surface of the superabrasive particle. In some aspects, the layer may substantially encase or enclose the entire superabrasive particle, while being chemically bonded thereto. It is to be understood that such layers are limited in some instances to a certain thickness. It is possible that a number of coated particles be consolidated together and a support matrix for the diamond particles formed from the coating of the particles.

The phrase "stroke length," as used herein, shall be understood to mean the distance the cutting wire travels in either direction as part of a reciprocating cutting motion.

The phrase "hard material," as used herein, shall be understood to mean any material that is difficult to cut, particularly in a reciprocating manner, such as granite stone or quartzite.

The following more detailed description is divided into sections merely for convenience of the reader. These sections are not to be construed as limiting in any way. The first section relates to the chemical bonding methods and materials unique to the present invention for creating a reciprocating wire saw having a cutting wire with superabrasive particles brazed thereto that is suitable for use on hard materials. The second section relates to the various exemplary embodiments of the present invention reciprocating wire saw, as well as to its several components. The third section pertains to various methods of using the present invention reciprocating wire saw to cut hard materials.

Brazed Superabrasive Particle Cutting Wire

Reciprocative cutting of hard materials has presented many problems, as discussed above, with the primary problems being abrasive particle retention and expense, depending upon which method is employed. The back and forth bi-directional cutting motion against the hard material in a reciprocating cutting tool induces significant impact and compression forces within the particles. These forces effectively function to dislodge the particles from their supported position due to the insufficient strength of the support matrix.

One way to further improve the retention characteristics of the abrasive particle is to utilize a molten braze that is bonded to the abrasive particle. The bonding strength of a molten braze is much greater than any conventional bonding methods and securely holds the particle in place in a protruded position. The protrusion of an uncoated particle is limited by the adherence strength of the support matrix. Indeed, too high a protrusion may contribute to premature failure of the matrix, wherein the particle becomes dislodged. Thus, a coated particle may protrude a greater distance than an uncoated particle.

The superabrasive particles of the present invention can be coated with a braze alloy to produce individually coated superabrasive particles. A braze bonded particle segment can cut a hard material in a reciprocating manner without requiring support from a matrix tail. In fact, the bonding strength of the braze may be so strong that the particle cannot be replaced once it becomes dull without ruining the entire cutting wire. In order to compensate for this, a metal powder may be used to moderate the bonding strength. At the same time, the added matrix material can be synchronized with the wear rate of the particle. Thus, by mixing particles with iron powder, copper powder, and a braze powder, abrasive particle saw segments can be fabricated to cut granite or other hard materials in a reciprocating manner at speeds at least three times as fast as that of an iron grit frame saw.

Notably, the improved retention aspects of the coated abrasive particles of the present invention are due in large measure to the amount of chemical bonding that is achieved between the coating and the superabrasive particle. The absence or nominal presence of such chemical bonding is a primary cause of premature grit pullout in tools employing known methods, such as electroplating and sintering.

The superabrasive particles used may be selected from a variety of specific types of diamond (e.g., polycrystalline diamond) and cubic boron nitride (e.g., polycrystalline cBN), and are capable of chemically bonding with a reactive material. Further, such particles may take a number of different shapes as required to accommodate specific cutting properties for the wire saw into which it is incorporated. However, in one aspect, the superabrasive particle may be diamond, including natural diamond, synthetic diamond, and polycrystalline diamond (PCD). In yet another aspect, the superabrasive particle may be cubic boron nitride (cBN), either single crystals or polycrystalline. Although superabrasive particles suitable for use in the present invention can have almost any mesh size, typical mesh sizes range from about 500 to about 35, depending on the wire diameter. Typical coated superabrasive particles can have a diameter which is from about $\frac{1}{6}^{th}$ to $\frac{1}{2}$ the diameter of the wire, and preferably about $\frac{1}{5}^{th}$ to about $\frac{1}{3}^{rd}$.

Additionally, a number of reactive elements may be used in the metal alloy in order to achieve the desired-chemical bonding with the superabrasive. A wide variety of reactive elements that can be alloyed with a metallic carrier are known to those skilled in the art, and the selection of a particular reactive element may depend on various factors. Examples of suitable reactive elements for inclusion in the braze alloy used in the present invention include without limitation, members selected from the group consisting of: aluminum (Al), boron (B), chromium (Cr), lithium (Li), magnesium (Mg), molybdenum (Mo), manganese (Mn), nirobium (Nb), silicon (Si), tantalum (Ta), titanium (Ti), vanadium (V), tungsten (W), zirconium (Zr), and mixtures thereof. In one aspect of the present invention, the reactive element can be Cr or Ti. In addition to the reactive element or elements, the braze alloy used to form the coating in accordance with the present invention includes at least one other metal as a carrier or solvent. Any metal recognized by one of ordinary skill in the art may be used as such a carrier or solvent, especially those known for use in making superabrasive tools. However, by way of example, and without limitation, in one aspect of the present invention, such metals may include Co, Cu, Fe, Ni, and alloys thereof. One currently preferred braze alloy composition includes Cr—Ni—B—Si.

In one exemplary embodiment, the present invention features a wire saw, wherein the superabrasive particles are bonded to a bead to be threaded over a wire as commonly known in the art. Referring now to FIG. 1, shown is a detailed cross-sectional, cut-away view of one cutting segment of a cutting wire 14. Cutting wire 14 comprises a bead 26 having a plurality of superabrasive particles 50 attached thereto. The plurality of superabrasive particles 50 are brazed to an exposed surface 30 of bead 26 in accordance with a pre-determined pattern. A braze material 60 is used to braze or bond superabrasive particles 50 to bead 26. Bead 26 may include a variety of materials, such as various metals. Examples of specific metals include, without limitation, cobalt, nickel, iron, copper, carbon, and their alloys or mixtures (e.g. tungsten or its carbide, steel, stainless steel, bronze, etc).

Typically, bead 26 has an outer exposed surface 30 upon which superabrasive particles 50 are to be affixed. Outer exposed surface 30 may be substantially flat or it may be contoured in one or more ways. However, in another exemplary embodiment, superabrasives 50 may be bonded to a matrix support material rather than directly to bead 26. The matrix support material may either be sufficiently configured to act as the cutting segment, or may be further coupled to bead 26 to form the cutting segment.

It is also contemplated that a plurality of layers of superabrasive materials may be formed on the bead of the cutting wire.

The methods and materials used to bond superabrasive particles to a bead in a single layer or in multiple layers are not described in detail herein. The methods and materials are more fully set forth in U.S. patent application Ser. No. 10/627,448, filed Jul. 25, 2003, and entitled, "Brazed Diamond Tools and Methods for Making the Same," which is incorporated by reference in its entirety herein, along with each of the priority applications cited therein.

Figure 2:
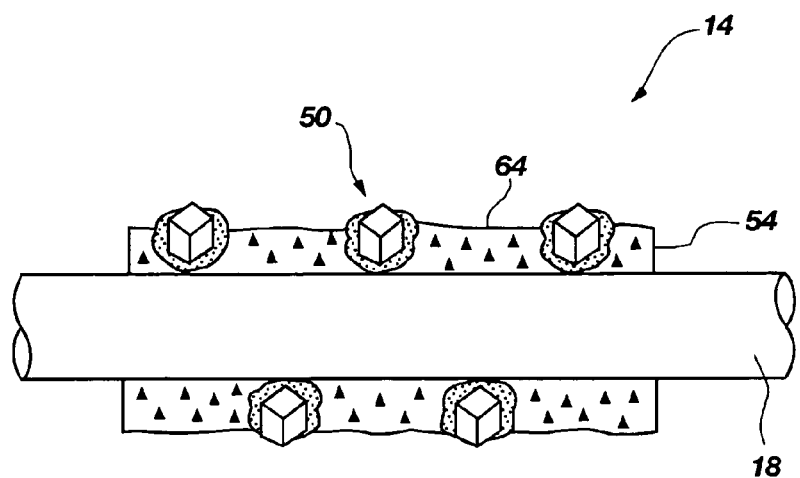
FIG. 2 illustrates a cut-away cross-section of an exemplary wire saw comprising superabrasive particles bonded directly to the flexible wire.

In another exemplary embodiment the present invention features a wire saw, wherein the superabrasive particles are bonded directly to the wire to form a cutting wire or cutting tool. This is shown in FIG. 2 and generally described in which cutting wire 14 comprises wire 18 having a superabrasive layer 54 and a plurality of individual coated superabrasive particles 50 attached or formed thereto with an organic binder 64. The coated superabrasive particles 50 may include a superabrasive particle, and a solidified coating of a molten braze alloy which is chemically bonded to the superabrasive particle. Although the present invention applies and utilizes this molten brazing technology, the particular methods and materials used to produce a cutting wire of this sort are not specifically described herein, but are more fully set forth in U.S. patent application Ser. No. 10/627,446, filed Jul. 25, 2003, and entitled, "Superabrasive Wire Saw and Associated Methods of Manufacture," which is incorporated by reference in its entirety herein, along with each of the priority applications cited therein.

Exemplary Reciprocating Wire Saw

The present invention features a reciprocating wire saw having improved superabrasive particle retention and improved cutting capabilities for use in cutting hard materials. The following section will set forth the various exemplary embodiments of the present invention reciprocating wire saw, along with its component parts. It should be noted beforehand that one of the primary advantages of the present invention wire saw is its ability to cut hard materials in a reciprocating manner, which ability greatly depends upon the particle-retention-characteristics of the cutting-wire. As such, despite the many different embodiments of the wire saw that will be presented, each cutting wire employed utilizes the brazing or chemical bonding technique set forth and incorporated above. Specifically, each cutting wire discussed herein has in common superabrasive particles that are brazed onto the cutting segments or beads to be threaded onto the wire (or onto the wire itself in other embodiments), such that they are anchored securely enough to withstand the forces acting upon them as a result of reciprocative cutting.

The present invention makes possible the cutting of hard materials in a reciprocating manner using a wire saw instead of conventional frame saws or continuous closed-loop unidirectional wire saws. As indicated above, wire saws are advantageous because less force is required to cut or slice through the hard material. In addition, iron grit frame saws that grind away the hard stone, although relatively inexpensive, are too slow, difficult to operate, are environmentally unfriendly, and are unable to cut thin slabs. Reciprocative cutting is advantageous because the cutting tool may comprise much less material and is cheaper to manufacture. Indeed, continuous closed-loop cutting wires that are designed for unidirectional cutting are extremely expensive to produce, as well as to operate. Nonetheless, as there is no current equipment designed for moving wire saws in a reciprocating cutting manner, frame saws may be used as examples of reciprocating cutting. Frame saws are able to cut using a stroke length or displacement distance between 40 and 100 cm (1 m). The rate of cutting may be anywhere between 80 and 120 cycles per minute. The longer the stroke, the slower the cutting rate; and, vice versa, the shorter the stroke, the faster the cutting rate.

Using a reciprocating wire saw laden with securely anchored superabrasive particles the cutting of hard materials is, among other things, much faster and much more accurate than that achieved by the conventional iron grinding process. This is in large part due to the pre-determined concentration of superabrasive particles that are able to be contained within along the cutting wire. However, not all particle concentrations will be the same for each cutting wire. Indeed, different cutting wires may comprise different particle concentrations depending upon the intended cutting job to be undertaken, as well as other factors known to those skilled in the art. Moreover, cutting wires may also consist of different sizes, both in terms of length and diameter, which will also affect the particle concentration, as well as the operation requirements needed. As referenced herein, superabrasive particle concentration is understood to mean the number or quantity of superabrasive particles that exist per a given distance of the cutting wire, such per meter, per foot, etc. For example, if the type of superabrasive particle being used is diamond and the length of the cutting wire measured in meters, which is typical of most cutting wires of the present invention, the unit quantity of superabrasive particles will be measured in carats, thus making the overall pre-determined superabrasive particle concentration a measurement of carats/meter.

The present invention improves the cutting of hard materials by increasing the cutting efficiency of the cutting wire over conventional wire saws. For conventional unidirectional wire saws having a bead diameter of 10 mm and utilizing diamond superabrasive particles, the typical diamond cutting efficiency is about 5000 $cm^2$/carat for granite stone. The effectiveness and efficiency of a particular cutting wire is a function of many things, including the concentration of the superabrasive particle within a given length of cutting wire, the size of the cutting wire, the particular material being cut, the reciprocating speed and stroke length of the cutting wire, and the force required to optimize the downward cutting speed. Also, the volume of kerf is linearly proportional to the diameter of the bead. However, the diamond weight is proportional to the square of the bead diameter. Consequently, the cutting efficiency of conventional wire saws may decrease linearly with the reduction of the size or diameter of the cutting wire of the wire saw. In addition, the life of the cutting wire is proportional to the diamond carat per meter. However, the more carats of diamond per meter the less cutting force each particle or grit has. Consequently, the downward cutting speed must be slowed to optimize the cutting capabilities of the particles.

For instance, a conventional unidirectional wire saw having a typical cutting wire configured in a continuous closed loop with a length of 20 meters must comprise a diamond weight that is maintained below 20 carats/meter in order to maintain the proper downward cutting speed. Therefore, no more than 40 beads are typically mounted in each meter of the cutting wire. Each diamond bead in a conventional cutting wire has a diamond coverage comprising about 5 mm in length. However, most conventional beads also contain at least three layers, on-average, of diamond particles to increase the wear life of the cutting wire. If the amount of diamond particles used to create a bead with three layers of diamond is spread over a single layer, the diamond coverage would be about 15 mm in length. With 40 beads threaded onto the wire, each comprising only a single layer, only about sixty percent (60%) of the total length of the cutting wire would be covered. In other words, only about 60% of the wire is capable of actually cutting or performing the cutting action, with this 60 percent comprising a particle concentration. As such, and based on the optimal concentration, a typical conventional unidirectional cutting wire having a 10 mm diameter is able to cut or slice 10 m² of granite stone. Therefore, it follows that one meter of cutting distance by the cutting wire is able to make 20 cuts or slices of a typical granite block of 0.5 m² per cut area. On the other hand, if the cutting wire diameter is reduced to 2 mm, the number of cuts or slices is also reduced five times to about 4 cuts or slices as the two are proportionately related.

Unlike conventional wire saws used to cut hard materials, the present invention wire saw utilizes an open ended cutting wire supported in tension, wherein the cutting wire is operated in a bidirectional or reciprocating manner. The reciprocating cutting motion is a function or is enabled because of the way the superabrasive particles are anchored brazed to the cutting wire per the chemical bonding technique described above. In addition, because of this unique chemical bond of the particles to the cutting wire, the cutting force of each particle is increased. This is due to the fact that the brazing process allows each particle to be positioned in a more favorable manner to achieve improved cutting results without requiring the support structure found in conventional wire saws. The increase in cutting ability of each superabrasive particle subsequently facilitates an increase in the concentration of superabrasive particles per a given identified distance of cutting wire (e.g., typically measured in meters). The increase in cutting force coupled with an increase in superabrasive concentration allows a greater amount of downward force to be applied to the material being cut from the cutting wire as compared to unidirectional cutting wires for prior related wire saws. An increase in applied downward force ultimately means an increase in cutting speed, thus allowing more slabs to be cut in less time. All of this results in a much more efficient wire saw over conventional wire saws used for cutting hard materials.

Reciprocating or oscillating rates of the present invention wire saw range between 60 and 140 cycles per minute. Stroke length ranges between 40 cm and 100 cm. The rate of reciprocation may be held constant or varied at any time during the cutting session. To achieve the most efficient or optimal cut, the rate of reciprocation is balanced against the downward force or constant downward speed for the particular material being cut.

Although the present invention reciprocating wire saw provides greater downward forces to be induced than conventional unidirectional wire saws, these forces still are not as great as those induced by a steel blade or grit grinding process. Because these forces are not as great, the cutting path of the cutting wire is able to be made much more true and straight. A straighter cut or slice means that there is less post-cut labor required to produce a finished piece.

In addition, less stress is induced into the material by the present invention reciprocating wire saw than that induced during by a grit grinding process. Because so many hard materials are also brittle, an overabundance or overload of stress is one of the primary contributors to the fracturing or breaking of the material during cutting. In order to offset the induced stress, each slab is cut to a minimum, safe thickness. However, the achieved minimum thickness by conventional techniques is still too thick to allow such hard materials to be used in many desirable settings, such as a decorative wall covering on the outside of buildings. On the other hand, the reciprocating wire saw of the present invention operates at significantly reduced stress levels. Stated differently, the present invention reciprocating wire saw is able to cut hard materials without inducing a lot of stress in these materials during the cutting session. As a result, much thinner slices or slabs of material can be manufactured without sacrificing surface area, thus making possible several new applications and opening up several new markets. For example, it is possible to cut a 5 m² slab of granite having a thickness of only 4 mm. Of course, other surface area sizes and slice thicknesses are possible as will be apparent to one skilled in the art. Optimal surface area to thickness ratios may be obtained through various testing procedures.

Particle concentration is an important aspect of the present invention. However, it should be noted that while particle concentration may be increased to obtain certain cutting advantages previously unobtainable by prior related wire saws, lower particle concentrations may also be desired and employed in wire saw manufactured in accordance with the teachings of the present invention. In addition, different concentrations are possible and may depend upon one or several factors, including, the material to be cut, the requirements of the cutting job, the accuracy of cut needed, and others.

Another feature of the present invention is the disposability of the cutting wires. The relatively inexpensive cutting wires that are able to be manufactured as a result of the present invention technology makes them suitable for optimal, yet limited use. For instance, by providing a high concentration of superabrasive particles, by providing superabrasive particles along a given length of the cutting wire to achieve a pre-determined stroke length, by providing a cutting wire with a pre-determined diameter, and by providing the ability to rotate the cutting wire along its longitudinal axis as needed during the cutting process, it is estimated that a cutting wire having a stroke length of one meter operating in a reciprocative manner will cut at least six slices of hard material of standard size (e.g., a granite block having a dimension of 5 m²). However, in most embodiments, a cutting wire of having a stroke length of one meter will comprise a suitable particle concentration and other cutting characteristics to be able to cut at least 2 slices of hard material of equivalent size, at which time the cutting wire will be replaced.

Moreover, the cutting process can be carried out and the cutting of the hard material controlled by a constant downward force or a fixed downward speed. In the case of a fixed downward speed, the downward force will be variable to account for the dulling of the cutting wire. In other words, as the cutting wire cuts and starts to dull, the force exerted will be increased to maintain the constant downward speed. However, the force can only be increased so much. Either the cutting wire will be so dull that it no longer cuts, or the cutting wire itself will fail. Either way, a maximum downward force is pre-determined and established that indicates or signals when the cutting of the hard material is no longer efficient or desirable. Once this threshold downward force is reached, the cutting wire is discarded and a new one inserted in its place. As such, the cutting wire of the present invention is designed to comprise a limited and pre-determined wear life. Depending upon the material being cut and other factors, such as particle concentration, downward speed, wire diameter, and others, it is intended that the cutting wire be replaced after a predetermined number of cuts. In other words, the cutting wire of the present invention is designed to be disposable and replaced with a new cutting wire at the most opportune time. In one aspect, the cutting wire is designed to provide efficient cutting of a single block of material of a given size with a given number of slices, after which it is to be replaced even though the cutting wire may still have the ability to cut. In another aspect, the cutting wire is designed to provide the most efficient cutting of two blocks of a given size, also with a given number of cuts. As such, the cutting wire may be manufactured and identified by its ability to make a certain number of cuts of a particular size in the most efficient manner. In any event, replacing the cutting wire or cutting wires effectively increases the throughput of each cutting job as cutting efficiency is kept at a maximum throughout the cutting session(s). Throughput is also improved because there is no requirement or need to interrupt the cutting session to make adjustments of the cutting wire, as is explained below.

With reference to FIG. 3-A, shown is a partial view of one exemplary embodiment of a cutting wire. In this embodiment, cutting wire 14 comprises a wire 18 having a plurality of beads 26 mounted thereon. Each bead 26 comprises a circular cross-sectional area or geometric configuration. Between each bead 26 is a spacer 70. Spacers 70 function to properly fix the position of beads 26 about wire 18 and to protect wire 18 as commonly known in the art. Spacers 70 can comprise springs (e.g. for quarry use), plastic (e.g., for sawing stone), or a spring fit inside a rubber spacer (e.g., for cutting concrete.

FIG. 3-B illustrates a partial view of another exemplary embodiment of a cutting wire. In this embodiment, the cutting wire 14 comprises a wire 18 having a plurality of beads 26 mounted thereon, wherein the beads 26 comprise a rectangular or square cross-sectional area or geometric configuration. Again, between each bead 26 is a spacer 70. The rectangular or square bead 26 comprises a certain, pre-determined thickness toward the cutting edge. The rectangular or square cutting bead may be made with multiple diamonds on the cutting side, or they can have double impregnated sides. In the latter case, the rectangular or square cutting segments can be turned upside down to renew the cutting edge once the original or initial cutting side is worn out. This concept is distinctly different than the conventional frame saw that requires a rigid support of cutting segments by a steel blade. In the present invention, the wire may be stiff or flexible. In addition, a conventional frame saw will convex toward the cutting side. On the other hand, the present invention allows concave bending of the wire to follow the cutting path. The elimination of the rigid support and convex profile will greatly reduce the cost of making the machine, as well as the cost associated with the tensioning required of each of the cutting blades in a conventional frame saw.

Using the configurations shown in FIGS. 3-A and 3-B, the concentration of superabrasive particles 50 per meter of cutting wire 14 is reduced because of the presence of spacers 70. However, according to the teachings herein, the particle concentration of cutting wire 14 may still be greater than prior related cutting wires. Unlike conventional cutting wires that hinder the cutting speed with high particle concentrations because of the loss of cutting force that typically results from increasing the particle concentration, cutting wire 14, with its increased particle concentration per meter, utilizes the brazing or chemical bonding technology described above that provides the superabrasive particles with an increased cutting force, thus allowing the cutting force and cutting speed to be maintained and, in many cases, increased. As such, the concentration of superabrasive particles 50 per a given stoke length (e.g., a meter) may be increased relative to prior related unidirectional cutting wires for wire saws.

Wire 18 can be any total length, can comprise any stroke length, and can be formed of any material which is capable of withstanding the conditions of wire saw usage, such as flexing and tension. Wires suitable for use in the present invention can typically be metal wires such as steel including high carbon steel, tungsten, copper, and the like. Other materials, whether currently known or yet to be developed could also be used such as polymers, carbon nanotubes, composites, and any other such material. In one aspect, the wire can be pretreated with a metal such as copper or brass to improve adhesion of coated superabrasive particles and organic binder as discussed in more detail below. Further, the wire can be provided as a single strand, a bundle or smaller strands or as a twisted bundle of smaller strands. The principles of the present invention can be applied using wires of almost any size and is largely governed by the intended application. As kerf loss is often an important factor, smaller wire gauge sizes are frequently preferred to avoid unnecessary waste of a work piece. In addition, the wires of the present invention can have circular or other cross-sectional profiles as known by those skilled in the art.

Figure 4:
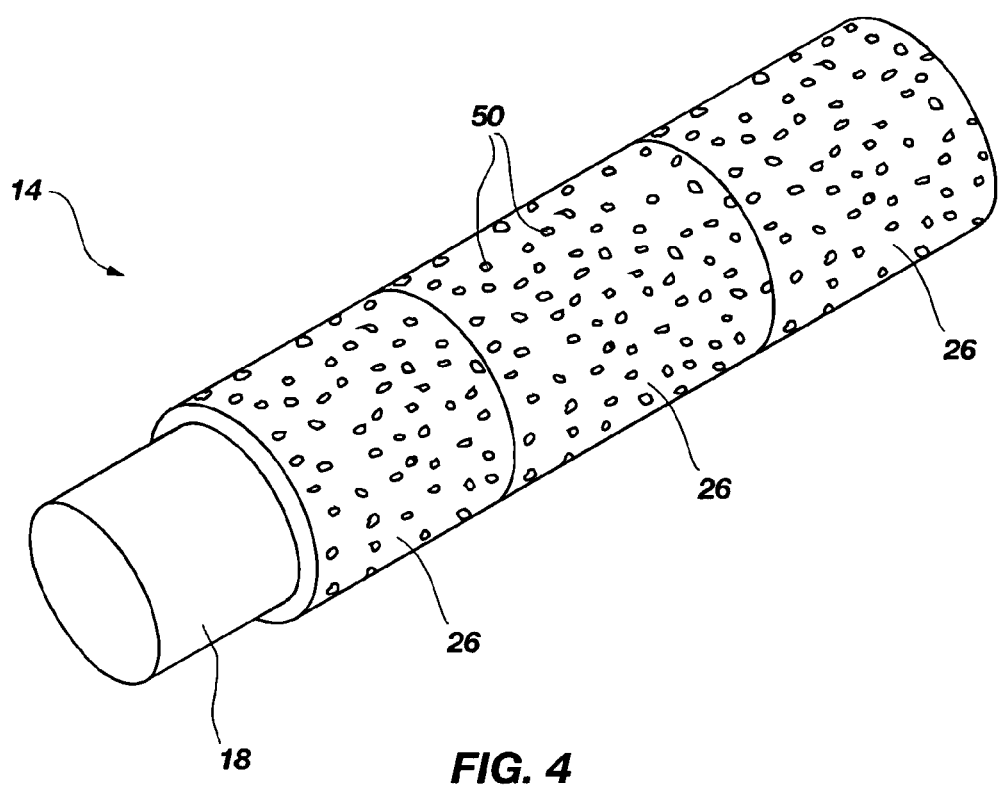
FIG. 4 illustrates a partial isometric view of an exemplary wire saw comprising beads threaded end to end onto a flexible wire such that they are directly adjacent or juxtaposed to one another, thus increasing the superabrasive particle concentration over the wire saw illustrated in FIG. 3-A or 3-B.

FIG. 4 illustrates another exemplary embodiment of a cutting wire, shown in partial view. As can be seen, cutting wire 14 also comprises a wire 18 having a plurality of beads 26 mounted thereon. However, in this embodiment beads 26 are juxtaposed to or positioned adjacent one another in an end to end fashion. Unlike prior related cutting wires that require the use of spacers, the present invention cutting wire may is capable of comprising a series of beads that are positioned adjacent one another along the cutting wire, thus eliminating the need for spacers. Eliminating the spacers from cutting wire 14 effectively and significantly increases the bead coverage along the distance of cutting wire 14.

Moreover, as the present invention wire saw utilizes reciprocative cutting and the unique brazing or chemical bonding technique for attaching the superabrasive particles to the beads higher downward forces may be exerted on the material being cut. As a result, more beads may be fit within a given distance, say a meter, along cutting wire 14. Increasing the bead coverage of cutting wire 14 effectively also increases the particle concentration. Indeed, cutting wire 14 provides a much higher particle concentration (e.g., carat concentration if diamond is used as the superabrasive) along cutting wire 14 as compared to the cutting wire illustrated in FIG. 3, as well as prior related cutting wires or wire saws. Essentially, by locating beads 26 in an end-to-end manner along cutting wire 14, there is provided nearly one hundred percent coverage of superabrasive particles 50 along the entire length of cutting wire 14, or at least the along the entire portion of cutting wire 14 used for cutting. This higher particle concentration is above that of prior related unidirectional cutting wires that typically cover only about 60% of the cutting length of the cutting wire, as described above.

Figure 5:
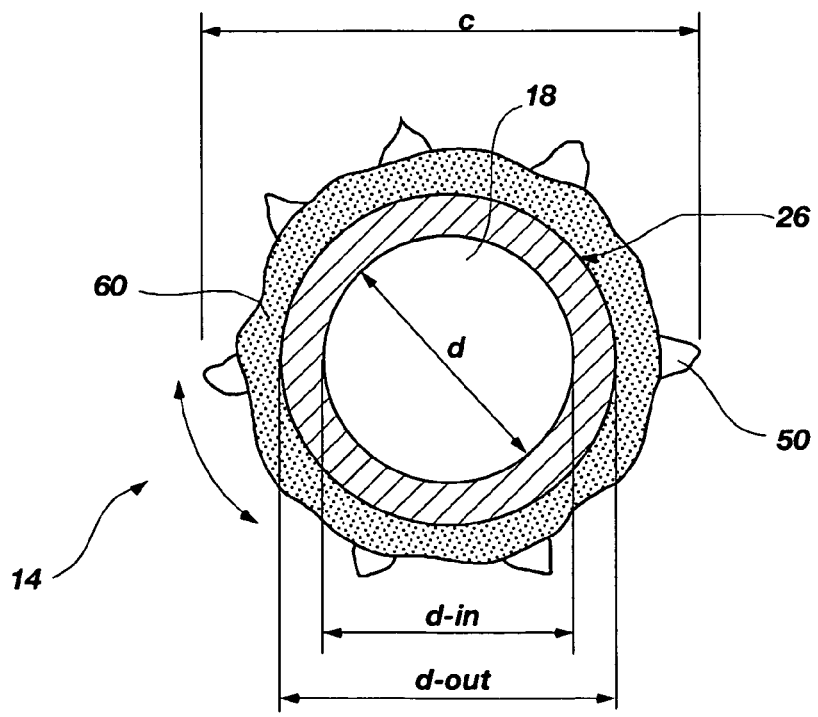
FIG. 5 illustrates a transverse cross-section of an exemplary wire saw.

With reference to FIG. 5, shown is a cross-section of cutting wire 14 taken transversely at a point along its length. Cutting wire 14 comprises a wire portion 18 having a diameter d. Cutting wire also comprises a bead 26 having inner and outer surfaces. Inner surface comprises an inner diameter labeled d-in that is slightly larger than the diameter of wire 18, such that bead 26 may be slid or threaded onto wire 18 as commonly known in the art. The outer surface of bead 26 comprises an outer diameter labeled as d-out. The difference between d-out and d-in defines the thickness or wall thickness of bead 26.

Attached to the outer surface of bead 26 is braze material 60 that is used to support superabrasive particles 50 in a fixed position about bead 26 according to the brazing or chemical bonding technique described above. A significant benefit of this brazing technique to chemically bond superabrasive particles 50 to the exterior of each bead 26 (or the wire itself in other embodiments), is that beads 26 may be made smaller. Specifically, the inner and outer diameters of each of beads 26 may be decreased over conventional beads utilizing other methods to attach superabrasive particles. A smaller bead size also means that wire 18 may be made smaller or the diameter of wire 18 decreased. Providing a decrease in bead size and a decrease in wire size contributes to an overall decrease in the size of cutting wire 14 over conventional cutting wires. For example, manufacturers of conventional cutting wires have a difficult time producing cutting wires that are as small as 6 mm in diameter because of the method used to attach the superabrasive particles. However, by utilizing the unique chemical brazing process described herein, cutting wires may be as small as 0.3 mm if the superabrasive particles are bonded directly to wire 18, or 1 mm if bonded to a series of beads. As such, cutting wires ranging from 0.3 mm and up are provided. The measured and identified diameter of cutting wire 14, represented by the letter c in FIG. 5, defines the cut width or kerf size through the material. This kerf size is measured from one side of cutting wire to the opposite side as shown.

In most exemplary embodiments, cutting wire 14 will comprise an overall diameter of around 1 mm. However, different sizes are contemplated as needed. As indicated, providing a cutting wire of such a small size effectively reduces or narrows the kerf size of the cut through the material. As such, loss due to kerf is greatly reduced. In addition, because kerf loss is reduced, overall material yield is increased, thus creating added value in each block of material. Other benefits include reduced manufacturing costs. Smaller parts mean less materials. And, since there is no need to protect the wire by injection molding, the cost is even further reduced.

FIG. 5 further illustrates the rotational feature of cutting wire 14 as indicated by the curved arrow. While not required, cutting wire 14 may be rotated to improve its wear and to eliminate excessive wear on any one side. During the cutting session, there is typically only a percentage of superabrasive particles in contact with the material at one time. As such, those superabrasive particles in contact with the material may begin to wear down. Since cutting wires are expensive to manufacture, it is desirable to utilize all of the superabrasive particles before the wire is discarded. Thus, in order to even their wear, cutting wires require rotation about their longitudinal axis to align a new set of superabrasive particles with the material, wherein these newly aligned particles will perform the cutting function. In conventional wire saws having a unidirectional cutting wire, the wire saw is required to be stopped so the cutting wire can be rotated. This interruption of the cutting session lengthens the time it takes to cut a given block of material, increases the cost, and is time consuming and labor intensive.

Unlike conventional wire saws, the wire saw of the present invention provides or allows in session rotation of cutting wire 14. Because of the reciprocative cutting motion made possible herein, rotation of cutting wire 14 does not require the wire saw to be stopped or the cutting session to be interrupted. Instead, rotation may be made on the fly during the cutting session so that cutting can be continued. Rotation may be continuous, or selective or periodic as needed, meaning that the cutting wire may be rotated in a continuous manner throughout the entire cutting session, or it may be rotated upon initiation by saw operators on an as needed basis. In any event, rotating cutting wire 14 functions to even its wear, thus improving its cutting efficiency and maximizing its life span.

Figure 6:
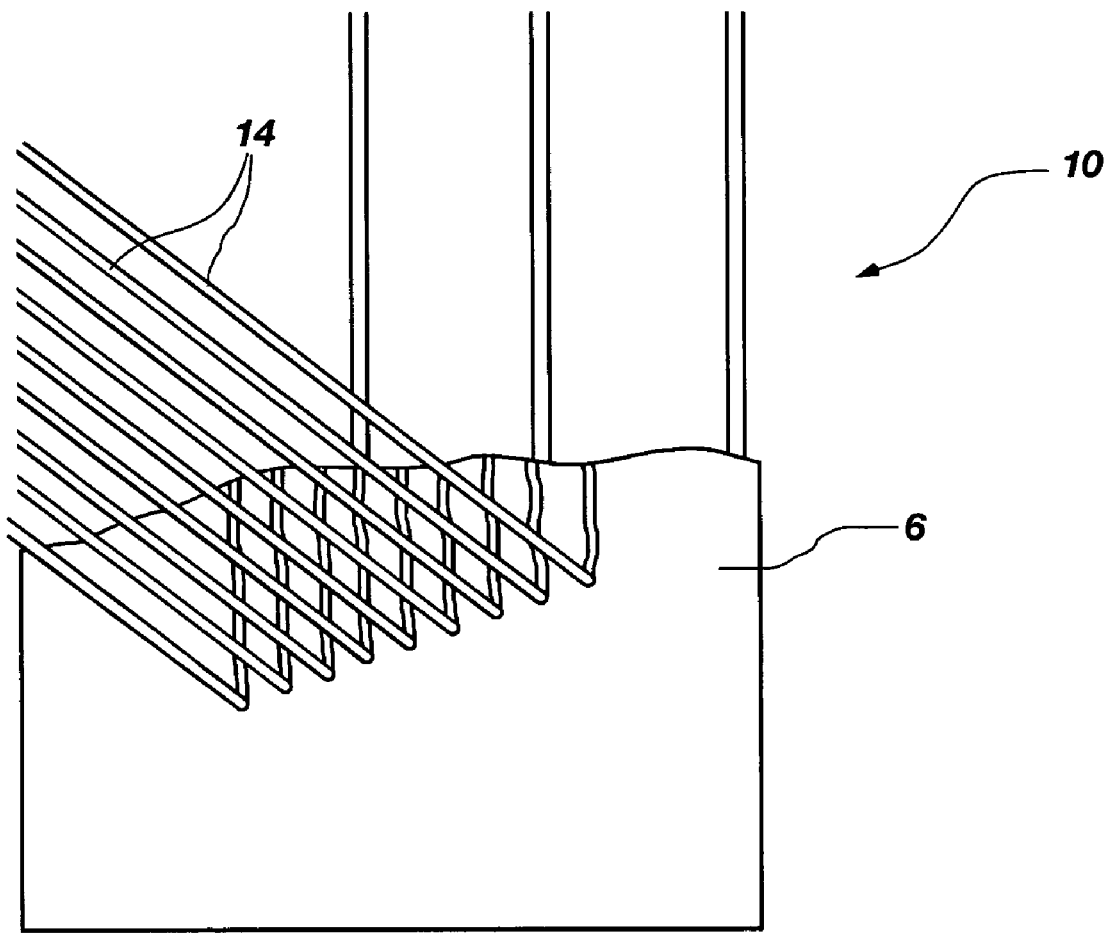
FIG. 6 illustrates an exemplary wire saw comprising a plurality of cutting wires configured to simultaneously cut through a material at varied or uniform thicknesses.

Referring now to FIG. 6, shown is a plurality of cutting wires used to simultaneously cut a material in a reciprocating manner. Multiple cutting wires 14 can be mounted in parallel with one another so slabs of material 6 can be sliced simultaneously. Although the present invention features a reciprocating wire saw 10, the specific manner of attachment of the cutting wires is not specifically described herein as there are numerous techniques or methods available in the art that can be used to mount these diamond wires. In addition, the specific equipment or machinery used to mount and drive these cutting wires is not described in detail. These general aspects of the present invention are not unique, but are readily available in the art. However, in one embodiment, a steel rectangular frame may be used to hold or support the cutting wires, wherein the steel frame is large-enough to completely surround the material being cut with its reciprocating motion. Each open end cutting wire may be fastened on the opposite sides of the steel frame. In order to guide the path of these wires, the other two sides of the rigid frame may be engaged in straight grooves of a supporting steel guiding block. Each cutting wire may further comprise a tensioning member, such as a spring, that allows the tension of the cutting wire to be independently adjusted. Moreover, each cutting wire may be independently rotated about its longitudinal axis during or after each cutting session to eliminate excessive wear on any one side.

In one aspect, the reciprocating cutting motion may be driven by a large fly wheel, such as those used to drive the reciprocating motion in conventional frame saws. In operation, the plurality of cutting wires, the rigid frame, and the guiding block, are caused to move toward the material to begin cutting. As the plurality of cutting wires contact the material, they effectively saw through the material to produce a plurality of slices or slabs of material. The positioning of each cutting wire may be strategically predetermined to create slabs of uniform or varying thickness. In order to allow multiple slabs to be cut at the same speed without worrying about the replacement of individual diamond wires, the diamond wires are designed to be disposable. Upon performing the intended number of cuts, they are discarded and replaced with a new set. A set of cutting wires will typically be designed to last only long enough to efficiently cut a single block of material.

Figure 7:
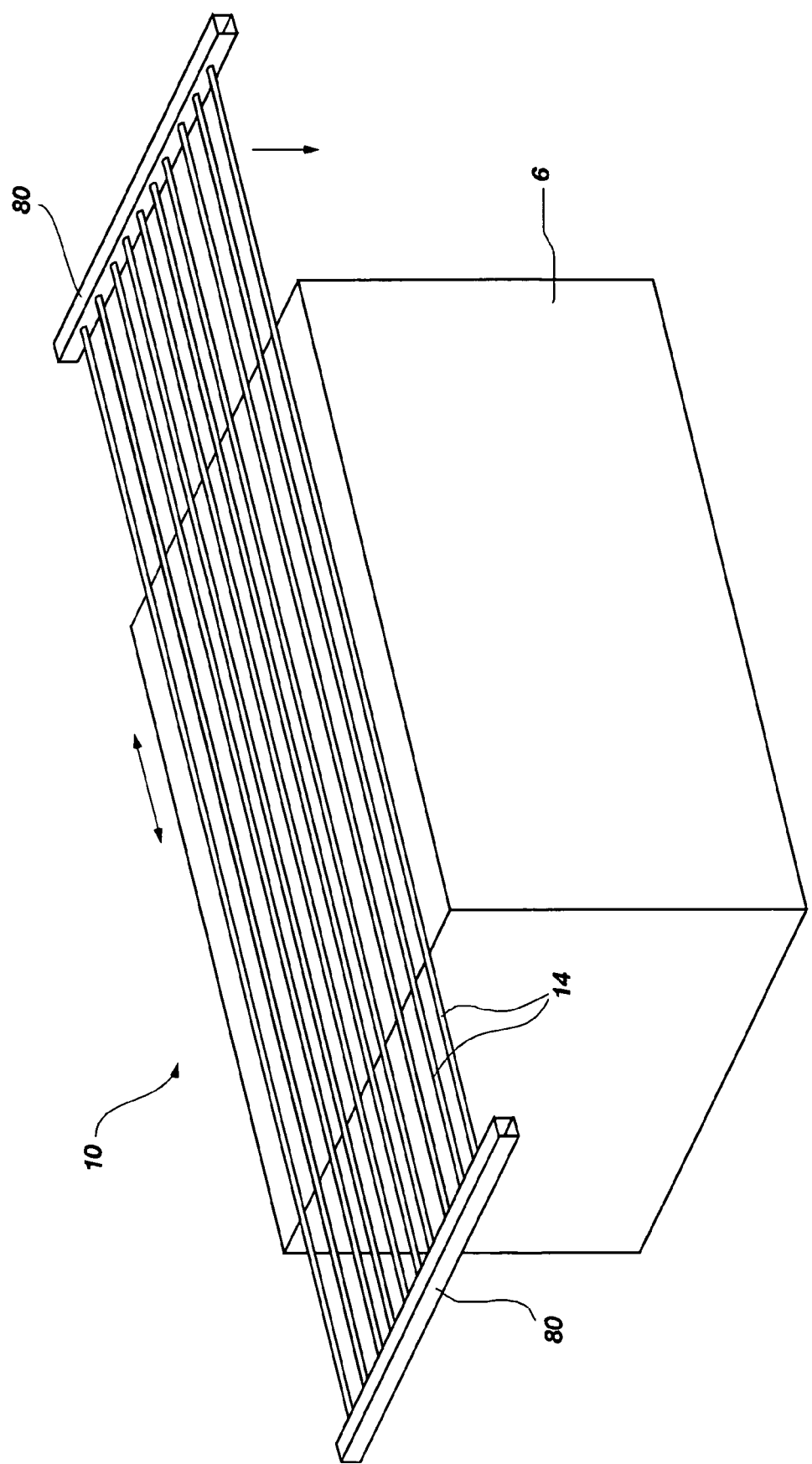
FIG. 7 illustrates one exemplary embodiment of a reciprocating wire saw comprising a plurality of cutting wires supported in tension between a frame component.

FIG. 7 illustrates another exemplary embodiment of a reciprocating wire saw 10, wherein a plurality of cutting wires 14 are supported in tension between a frame support member 80. Instead of wrapping around the material or object to be cut as in other embodiments, the wire saw in FIG. 7 in a designated direction as indicated by the arrows pointing downward. In this case, frame support member 80 is driven by some type of drive mechanism that functions to oscillate cutting wires 14 back and forth within a predetermined stroke. The tension induced within cutting wires 14 may be as determined by one skilled in the art based on the material being cut and other contributing factors.

The reciprocating wire saw of the present invention provides many advantages over unidirectional wire saws used to cut hard materials, as well as those conventional frame saws discussed above that utilize steel bands and an iron grinding process to grind away the hard materials to form a cut. Many of these advantages are explained and set forth herein. First, hard material, such as granite stone, may be cut in a reciprocating manner. Cutting hard materials with wire saws has typically been done using a frame saw or a unidirectional wire saw, but not a reciprocating wire saw. Second, as the cutting wire can be made smaller, the loss due to cutting kerf is also significantly reduced. Third, slab yield is higher as kerf loss is reduced. Fourth, because the cutting wire can cut with a lower force than sliding steel blades, the cutting path is kept straighter. Fifth, less work is required because of the cutting efficiency of the superabrasive particles as braze bonded to the wire. Sixth, cuts are made in less time as compared to the slow grinding process of prior related grit grinding saws. Seventh, cutting wire expenses are significantly reduced. Indeed, the cutting wires are inexpensive as compared to prior art unidirectional cutting wires, thus allowing the cutting efficiency of the present invention cutting wires to be optimized for a predetermined number of cuts, as well as providing for the subsequent disposal of the cutting wire once this number of cuts is completed. Eighth, large slabs of hard material can be manufactured that are thinner than the thinnest slabs produced by prior related wire saws. This is made possible because of the ability to reduce the size of the cutting wire, and because of the ability to reduce the stress levels in the material being cut. For instance, large 5 $m^2$ slabs that are only 4 mm in thickness may be manufactured. These thin slabs have heretofore been nearly impossible to manufacture by prior related wire saws, especially when taking into consideration crucial economical factors. Thin slabs opens new markets that were previously unavailable.

Methods of Use

The present invention further features a method for cutting thin slabs of a hard material. The method comprises (a) identifying a hard material to be cut; (b) obtaining a reciprocating wire saw comprising a cutting wire configured for cutting in a reciprocating manner; (c) positioning the cutting wire to follow a pre-determined cut path through at least a portion of the hard material; (d) oscillating the cutting wire at a pre-determined rate; and (e) causing the cutting wire to reciprocatively cut along the cut path.

The method step of obtaining a reciprocating wire saw comprises obtaining a wire saw as explained in one of the embodiments presented above. In one aspect, the wire saw will comprise a cutting wire with superabrasive particles bonded directly to the wire. In another aspect, the wire saw will comprise a plurality of beads threaded onto the wire, wherein the beads have bonded thereto a plurality of superabrasive particles.

The method further comprises rotating the cutting wire during a cutting session without interrupting the cutting session. Rotating the cutting wire evens out the wear of the superabrasive particles and boosts efficiency. Because of the unique reciprocating nature of the present invention wire saw, the cutting wire may be rotated without interrupting the cutting session. In other words, the cutting wire may be rotated on the fly.

The method further comprises disposing of the cutting wire upon completing a pre-determined number of cuts. The present invention allows cutting wires to be disposed of after a certain number of cuts, such as those needed to cut a single block into 20 slices. Their uniquely small size and low cost of manufacture allows the present invention cutting wires to be designed to provide the highest cutting efficiency for a given number of cuts and then to be disposed of without undue cost to the user in replacing the cutting wire. Indeed, once the pre-determined number of cuts are made, it is intended that the cutting efficiency of the cutting wire be significantly reduced such that its usefulness is decreased, thus encouraging users to dispose of the cutting wire and install a new one in its place.

The following examples illustrate the system and method of using the present invention reciprocating wire saw. It is noted that the following examples are not to be construed as limiting in any way. Indeed, one skilled in the art will recognize other advantages and benefits of the present invention that are not specifically recited, but that will be apparent to those skilled in the art upon reading the detailed description provided herein and practicing the invention.

EXAMPLE ONE

A typical cut block (e.g., granite) has a dimension of 3 meters long by 2 meters tall. Hence, the area to cut is about 5 $m^2$. A disposable wire saw utilizing the technology of the present invention is obtained that is designed to make two cuts. However, the wire saw will be replaced after making one cut (safety factor equals to 2). In order to cut 10 $m^2$, at least 20 carats of diamond must be consumed. For a typical application, 40/50 mesh diamond is used. Each diamond crystal has a size of about 360 microns (0.36 mm). Securely fastened or fitted to the wire saw are 7 beads (pearls), each comprised of steel sleeves that are 6 mm in outside diameter and 6 mm long. The steel beads may comprise other shapes besides a circular or curved cross-sectional area. For example, the beads may comprise a square or rectangular cross-sectional area. The steel sleeve beads also comprise an outside surface onto which diamond grits are brazed bonded.

The diamond will be spaced with one grit distance apart so there will be about 25 particles around the circumference of the bead and about 8 along the length, with a total diamond count of 200. There are 1334 particles for each carat of diamond in 40/50 mesh, so each bead contains about 0.15 carats. At most, each carat is able to cut 0.5 $m^2$ of granite block. Thus, about 7 beads are necessary to cut 1 $m^2$. To cut 10 $m^2$, 70 beads are needed, which will cover a length of about 40 cm. Therefore, a stroke of 40 cm is the minimum that is required to make 2 cuts of the granite block.

The above example assumes that the wire saw is fitted with diamond beads along its entire length. However, for practical purposes the beads are separated by a spacer, which functions to allow the flow of cooling water and the removal of debris. Thus, the fastening of the beads can be achieved by injection molding with plastic or rubber that is squeezed between the gap of the wire and the inside of the bead. The plastic or rubber also serves as the spacer. The plastic or rubber also protects the wire from rust or from being corroded by the cooling water.

In addition, only one side of the bead is used unless there is periodic rotation of the bead. Consequently, a much longer stroke is needed to make two cuts. For example, a stroke of 1 m may be needed to allow enough diamond beads to perform in making two cuts. The wire saw can be replaced after each cut to ensure that no areas of the wire are worn when attempting to perform another cut.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. Accordingly, the scope of the invention should be determined solely by the appended claims and their legal equivalents, rather than by the descriptions and examples given above.

What is claimed is:

1. A reciprocating wire saw for cutting a hard material comprising:
   a flexible wire;
   a plurality of cutting segments fitted onto said flexible wire and positioned directly adjacent one another end to end to form a cutting wire, said cutting segments each comprising an outer surface having at least one flat surface; and
   a plurality of superabrasive particles braze bonded onto said outer surface of said cutting segments, said cutting wire thus being configured to cut in a reciprocating manner.

2. The reciprocating wire saw of claim 1, wherein said plurality of superabrasive particles are braze bonded to said plurality of cutting segments such that said cutting wire comprises a pre-determined superabrasive particle concentration.

3. The reciprocating wire saw of claim 2, wherein said cutting wire further comprises a plurality of spacers positioned between each of said cutting segments, thereby decreasing said pre-determined superabrasive particle concentration along said cutting wire.

4. The reciprocating wire saw of claim 2, wherein said pre-determined superabrasive particle concentration is measured per a given distance along said cutting wire.

5. The reciprocating wire saw of claim 2, wherein said each of said cutting segments comprises at least 0.10 carats of diamond.

6. The reciprocating wire saw of claim 1, wherein said cutting wire oscillates back and forth at a rate ranging between 60 and 140 cycles per minute.

7. The reciprocating wire saw of claim 1, wherein said cutting wire comprises a reciprocating stroke between 40 cm and 100 cm.

8. The reciprocating wire saw of claim 1, wherein said cutting wire is flexible.

9. The reciprocating wire saw of claim 1, wherein said cutting wire comprises a diameter between about 1 mm and 6 mm.

10. The reciprocating wire saw of claim 1, wherein said cutting wire comprises a diameter of at least 6 mm.

11. The reciprocating wire saw of claim 1, further comprising a biasing element configured to regulate a tension in said cutting wire.

12. The reciprocating wire saw of claim 1, wherein said cutting wire comprises a cutting efficiency designed to cut a pre-determined number of cuts of a hard material, after which said cutting wire is discarded.

13. The reciprocating wire saw of claim 12, wherein said cutting efficiency is calculated for a pre-determined number of cuts of a single block of hard material.

14. The reciprocating wire saw of claim 1, wherein said cutting wire is selectively rotated during a cutting session, without interrupting the cutting, to provide even wear of said superabrasive particles.

15. The reciprocating wire saw of claim 13, wherein said rotation is selected from the group consisting of continuous and periodic.

16. The reciprocating wire saw of claim 1, wherein said cutting wire cuts a hard material at a constant downward speed.

17. The reciprocating wire saw of claim 1, wherein said cutting wire cuts a hard material at a pre-determined fixed downward force.

18. The reciprocating wire saw of claim 1, wherein said beads comprise a plurality of layers arranged in a substantially parallel relationship, each of said layers having a plurality of superabrasive particles braze bonded thereto.

19. The reciprocating wire saw of claim 1, wherein said superabrasive particles are selected from the type consisting of diamond, and cubic boron nitride.

20. The reciprocating wire saw of claim 1, wherein said cutting wire is configured to cut hard materials selected from the group consisting of granite, quartzite, and concrete.

21. The reciprocating wire saw of claim 1, further comprising a plurality of cutting wires configured to simultaneously cut a hard material.

22. The reciprocating wire saw of claim 1, wherein said cutting segments comprise a sleeve.

23. The reciprocating wire saw of claim 1, wherein said wire comprises a steel cable.

24. The reciprocating wire saw of claim 1, wherein said braze contains at least one element selected from the group consisting of nickel, chromium, copper, and titanium.

25. The reciprocating wire saw of claim 1, wherein said cutting segments comprise a cross-sectional geometric configuration selected from the group consisting of linear, nonlinear, and any combination of these.

26. A reciprocating wire saw for cutting a hard material comprising:
   at least one flexible wire supported in tension within a frame component;
   a plurality of superabrasive particles braze bonded to a plurality of cutting segments positioned adjacent one another end to end about said flexible wire to form a cutting wire having a pre-determined superabrasive particle concentration and configured to cut a hard material in a reciprocating manner, said cutting segments each comprising at least one flat surface; and
   drive means configured to oscillate said cutting wire back and forth to achieve a reciprocating cutting motion.

27. A method for cutting thin slabs of a hard material comprising:
   identifying a hard material to be cut;
   obtaining a reciprocating wire saw comprising a cutting wire configured for cutting in a reciprocating manner, said cutting wire having at least one flat surface, a flexible wire, a plurality of cutting segments, and a plurality of superabrasive particles braze bonded onto an outer surface of said cutting segments, wherein said cutting segments are threaded onto said flexible wire and positioned next to one another end to end to provide said cutting wire with a pre-determined concentration of superabrasive particles;

positioning said cutting wire to follow a pre-determined cut path through at least a portion of said hard material;

oscillating said cutting wire at a pre-determined rate; and causing said cutting wire to cut in a reciprocating manner along said cut path.

28. The method of claim 27, further comprising rotating said cutting wire during a cutting session without interrupting said cutting session.

29. The method of claim 27, further comprising ceasing cutting of said slab upon completing a pre-determined number of cuts.

* * * * *